United States Patent Office 3,477,160
Patented Nov. 11, 1969

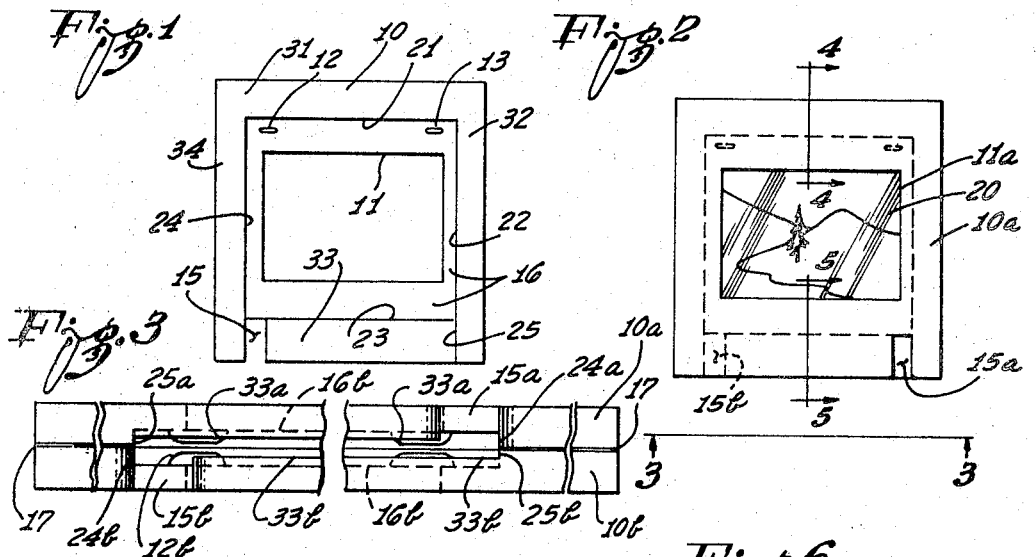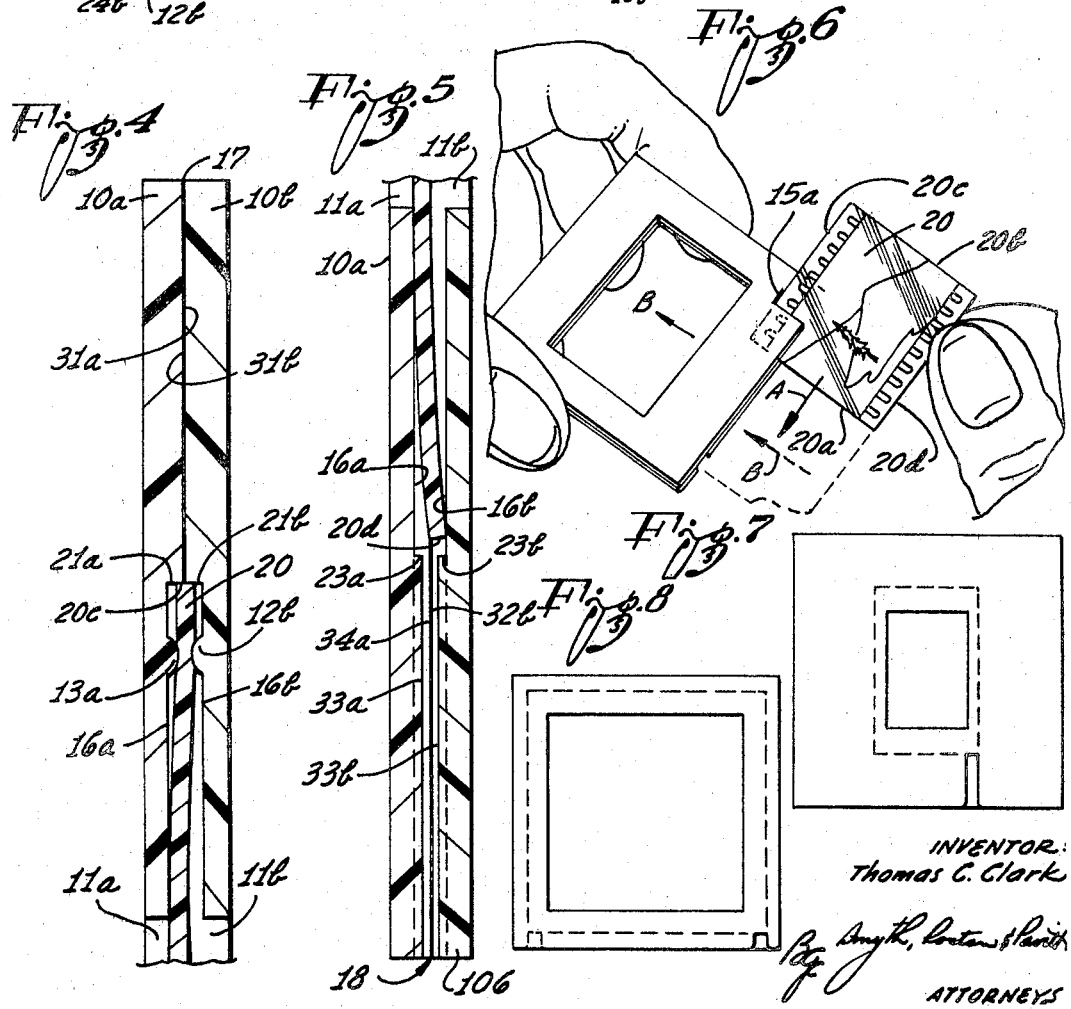

3,477,160
SLIDE BINDER
Thomas C. Clark, 8410 Gulana Ave., Apt. 2,
Playa del Rey, Calif. 90291
Filed Jan. 12, 1968, Ser. No. 697,335
Int. Cl. G09f 1/12
U.S. Cl. 40—152                                12 Claims

ABSTRACT OF THE DISCLOSURE

A slide binder is formed from two similar flat, overlying members forming a cavity with registering windows and entrance slot. Gripping bosses suspend a transparency in the cavity spreading the transparency flat at one window. The cavity permits thermal expansion of the transparency.

---

The present invention relates to a slide binder or slide mount adapted for use in slide projectors. Slide binders and slide mounts are known in numerous configurations and they can be divided basically into two classes. In one class the slide or transparency is sandwiched in between two glass plates and the slide binder is constructed as a holder or frame for the glass plates. The other class of slide binders includes framing elements for providing a holder for the transparency without glass cover. The holder or frame is constructed here merely to permit placement of the slide into a projector. The transparency itself is a flat, easily deformable object, not readily insertable, per se, into a projector. The holder or frame having sufficient stiffness remedies the situation. Usually in this class, carboard type slide binders have been most commonly used. However, plastic slide binders have been suggested.

While glass mounts offers (as primary purpose) protection to the slide, the all-too-well known schlieren rings are very detrimental side effects. Moreover, slide projectors with automatic slide exchange are almost exclusively in use now. The slides are placed in a tray cooperating with the projector in a manner that the slides are handled by equipment only. Thus, the need for protection is greatly diminished so that the more economical slide binders without glass plates suffice. The invention thus relates to slide binders without glass plates.

Slide binders can also be divided into two different classes: reusable ones and not reusable ones. For the latter class, the transparency becomes permanently fixed in the frame, mount or binder. This does not merely relate to a permanent closing of the mount or frame after mounting the transparency, but the transparency itself may be permanently affixed to the frame or mout. For example, cardboard mounts are commonly used wherein the transparency is glued to the mount. The mount is, of course, not reusable. Affixing of the transparency may be practical for retaining it in a particular position, but affixing is also responsible for the common "popping" of a slide, accompanied by the annoying, sudden "out-of-focus" of part of the slide image. The slide tends to expand due to heating in the projector, but its being affixed along the margins prevents expansion in the plane of extension and forced bending is the result.

The invention now relates to a slide binder of the reusable type, whereby the slide is not permanently affixed to the mount. Efforts have been made in the past to provide slide binders in such a manner that the transparency is removably positionable therein. Glass mounts within this class usually have two glass plates holding the transparency and being placed in an openable and reopenable frame. Reusable slide binders without glass plates are usually constructed as a foldable element, initially in folded open position, and after the transparency has been placed in the required position the binder is folded and the transparency is entrapped in the fold. A slide binder constructed in this manner for permitting exchange of the slide usually requires a rather accurate mold for the casting process, if plastic is used. In all these cases, the transparencies must be precut to a size appropriate for insertion in the binder.

The slide binder, in accordance with the present invention, is of the nonglass mount, reusable type and is constructed by using two, preferably similar, binder elements glued together along three sides, forming a flat envelope type jacket having an entrance opening into which slide is shifted. The jacket thus formed has an interior cavity which is rather shallow but deeper than the height of the entrance opening; there are means in the cavity such as registering bosses slightly gripping a transparency preferably along one margin thereof and retaining its position. The boundaries of the cavity place the transparency in a flat position without fixing its position further, whereby the cavity is dimensioned permitting the slide to thermally expand without warping. The binder is constructed to permit insertion of a transparency in such a manner that it can be cut to the proper size during the insertion process after a preliminary insertion has been performed.

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings, in which:

FIGURE 1 illustrates a single slide binder element or member, the view is an elevation from that side which will later on form the cavity and shows also surface portion to which another similar element is to be joined;

FIGURE 2 illustrates an elevation of a slide binder and can also be regarded as a view of the element shown in FIGURE 1, but from the opposite side thereof;

FIGURES 3, 4 and 5 illustrate enlarged views of the binder shown in FIGURE 2 and respectively from planes defined by lines 3—3, 4—4 and 5—5 in FIGURE 2;

FIGURE 6 illustrates the insertion of a transparency into the slide binder shown in FIGURES 1 through 5; and FIGURES 7 and 8 illustrate elevational view for slide binders of different internal dimensions to accommodate different size transparencies.

Proceeding now to the detailed description of the drawings, in FIGURE 1 thereof there is shown a top elevation of a slide binder element or member 10 in accordance with the preferred embodiment of the invention. The element is made, for example, of a polystyrene, known also as high impact styrene. The view in FIGURE 1 is from that side which, after assembly of two such elements to form a slide binder, will define the interior cavity of such a binder receiving the transparency. The element 10 illustrated is a flat, rectangular piece of plastic having a rectangular window 11. The dimensions of window 11 are, for example, equal to or slightly smaller than the size of the picture area of a regular 35 millimeter photographic transparency.

The window 11 is circumscribed by four ledges respectively denoted with reference numeral 21, 22, 23 and 24, and leaving between them and the window 11 a relatively depressed, flat area 16. These ledges together with area 16 form one-half of the cavity for retaining a transparency. Ledges 21 and 22 and 24 together with three outer edges of elements 10 define a U-shaped surface, composed of coplanar, strip-shaped portions 31, 32 and 33. This U-shaped surface portion 31-32-33 defines the surface area with which the slide binder element is attached to a corresponding U-shaped surface portion of a second, similarly shaped slide binder element.

Ledges 21, 22 and 24 are 7.5 milli-inches high, which is thus the height of surface areas 31-32-33 above cavity bottom 16. Two bosses 12 and 13 having a height smaller than the height of ledge 21, extend from cavity bottom 16 in the vicinity of ledge 21. For reasons below, a height of 4 milli-inches was found most suitable. The bosses are placed symmetrically in the cavity; particularly they have equal distances from ledge 21, and the distance of boss 12 from ledge 24 equals the distance of boss 13 from ledge 22. The reason for this is that upon overlying two such elements, the bosses must register in pairs.

In the process of making an element using dies wherein the surfaces forming bottom 16 are parallel to the surface forming surfaces 31, 32 and 34, it was observed that subsequently the several portions of bottom surface 16 tend to slightly angle up. This is no detriment, it merely places the bosses 12 and 13 a trifle (less than half a milli-inch or thereabouts) closer to the plane as defined by surface portions 31, 32 and 34, i.e., slightly less than the 3.5 milli-inches resulting from ledge height (7.5 milli-inches) minus boss height (4 milli-inches). The height of the bosses and their distance from ledge 21 has been so chosen to take that into account.

Ledge 23 positioned opposite to ledge 21 has a lesser height from bottom 16 than have ledges 21, 22 and 24, so that a somewhat depressed surface portion 33 is defined along the fourth side of the square-shaped piece 10. Ledge 23 has, for example, a height of 3.5 milli-inches above bottom 16. A ledge 25 is thus formed between surface portion 32 of the element and the somewhat depressed surface portion 33 of the binder element 10. Ledge 25 is thus 4 milli-inches high. A slot or recess 15 is provided alongside surface portion 33. The slot has a depth to be flush with ledge 23. One side of the slot is flush with ledge 24, so that a ledge is not formed between depressed surface 33 and surface portion 34.

FIGURE 2 shows two such slide binder elements assembled to form a complete slide binder and illustrated in plan view, thus showing actually only the outside of one element (10a). Registering ledges are depicted in dotted lines. The common window is formed by alignment of the individual windows in each element, with a slide 20 in between. The only asymmetry present results from non-alignment of the two slots 15a and 15b. In the following, the two binder elements are denoted with reference numerals 10a and 10b, and other corresponding elements and features are distinguished by the reference characters a and b appended to the reference numerals used for explaining the single slide binder element with reference to FIGURE 1. The assembled slide binder is, moreover, shown in the several sectional views of FIGURES 4 and 5 and the front view of FIGURE 3.

The two binder elements on members 10a and 10b are preferably colored differently, facilitating correct insertion. Only the first slide may possibly be inserted incorrectly in a projector, if the user forgets the correct insertion as to the color. Thereafter he merely has to follow the same color scheme, provided, of course, the slides are symmetrically mounted in the binders following the same scheme. One of the members may, for example, be black, the other white, so that the outer surface can be used for labeling by directly writing on the white surface.

The view of FIGURE 3 into the slide binder as essembled is without having a slide inserted. The view, of course, is greatly enlarged and one can see that an entrance mouth or opening is being formed. This opening is defined by the outer edges of the plateaus 33a and 33b, facing each other across a flat slot now formed after assembly of two elements and for receiving a transparency during insertion thereof. On the left hand side the ledge 25b of element 10b is vertically aligned with ledge 24a of element 10a, whereas on the left hand side ledge 24b is aligned with ledge 25a. This forms a narrow rectangularly shaped entrance opening through which the slide can be inserted and removed. The slide binder is thus a jacket or envelope formed by the two members 10a and 10b and having a rather narrow entrance opening. Bosses 12a, 12b, and 13a, 13b are visible through that opening; they serve as grippers for a transparency when inserted. The cavity for receiving and holding a transparency is now defined as follows: Registering ledges 21a and 21b form the rear wall; registering ledges 24a and 22b form one side wall, and registering ledges 22a and 24b form the other side wall. Ledges 23a and 23b do not meet but form the entrance slot proper to the cavity; bottoms 16a and 16b now form top and bottom of the cavity, however, for convenience the designation bottom surface will be retained for either of them.

A word about the assembly and the resulting dimensions is now in order. For this, it should be noted that the elements 10a and 10b are permanently joined through usage of a solvent. Since, as stated, the best suitable material for the binder elements was found to be high impact polystyrene, cementing of the elements was found to be inadvisable. Instead, a polystyrene solvent was used and placed in minute quantities along the surface portions, for example, 31, 32 and 34, of one of the binder elements; the solvent must just suffice to wet the surface portions. The other element is then placed on top of the first one and in registering position, so that surface portion 31a faces surface portion 34b, 32a faces 32b and 34a faces 31b. Reference numeral 17 in FIGURES 3, 4 and 5 denotes the areas of fusion. The solvent spreads and fuses the two elements together.

As preferably slight pressure is being applied to the two elements after joining them in this manner, the ledges 21a, 21b, 22a, etc., are slightly reduced in height.

Each of the highest ledges such as 21 (i.e., 21a and 21b) was initially 7.5 milli-inches, but the height of the cavity, i.e., the distance between the two respective bottoms 16a and 16b is less than 15 milli-inches. This, per se, is of little consequence; important, however, is that the bosses such as 12a, 12b, etc., each extend 4 milli-inches from the respective bottom surface (i.e., for 3.5 milli-inches less than ledge height), but registering bosses, such as 12a and 13b, are now less than 7 milli-inches apart. It was found that they are about 5 to 6 milli-inches apart. A contributing factor for the size of the gap between two vertically-aligned bosses is further that, as stated above, the surface 16 of an element is not ideally coplanar with surface portions 31, etc., tending to bring a boss 12 or 13 somewhat closer to the plane defined by surface portion 31. The ultimate result is that the registering bosses 12a-13b and 13a-12b define gaps about half or one milli-inch narrower than the thickness of a film which is about 6.5 milli-inches. The height of the entrance opening, i.e., the distance between plateaus 33a and 33b is thoretically about 8 milli-inches, but operation of the solvent reduces it to about 7½ milli-inches or thereabouts, still more than the thickness of a film.

One can further see that each of the slots 15a and 15b is respectively positioned opposite to a portion of plateau 33b and 33a, respectively. Therefore, each of the slots defines an entrance into which a transparency can be slid sideways. This is illustrated in FIGURE 6 showing insertion of a transparency along one of its sides (side 20c) provided with sprocket holes. In particular FIGURE 6 shows insertion of a slide 20 laterally into the entrance slot defined by plateaus 33a and 33b, through slot 15a. The user will slide a precut transparency in the direction of arrow A, as illustrated, until the leading edge 20a of the transparency, as far as the sliding motion is concerned, abuts the aligned ledges 25a-24b. If the slide has been properly cut, the rear edge 20b of the transparency is flush with the aligned ledges 25b and 24a bounding one slot. In this position a strip along edge 20c of the transparency drops into and becomes positioned completely in the entrance slot or channel between plateaus 33a and 33b. Subsequently the transparency will be pushed in direction of arrow B; for this the user should use tweezers, gripping the transparency somewhere along edge 20d. The formerly leading edge 20a will now slide along the cavity side wall formed by the aligned edges 24b and 22a. As the now leading edge 20c of the transparency abuts the rear wall of the cavity formed by the vertically aligned ledges 21a and 21b, the transparency is in final position. However, prior to abutment of edge 20c with the alinged ledges 21a and 21b, the slide has to pass through the gaps defined by the aligned bosses 12a–13b and 12b–13a. As these gaps are a trifle narrower than the film is thick, a slight squeeze is necesary to overcome the resistance of the bosses. As bosses and film are resilient to the extent needed to overcome the slight difference between gap width and film thickness, the slide can be pushed farther until abutting ledges 21a and 21b. However, the slide will subsequently be gripped and positioned by these aligned bosses.

Should the user mistakenly believe that the resistance he feels upon encountering the bosses is due to the rear wall of the cavity, he can discover his mistake by looking to either slot, 15a or 15b. If a portion of the rear edge (20d) of the transparency is still visible, then it is not yet completely inserted. The bottom of each slot 15a and 15b is flush with the respective ledge, 23a and 23b, and the edge 20d of a completely inserted transparency is behind one of those ledges (see FIGURE 5).

In the final phase of insertion the rear edge 20d of the transparency has cleared the aligned ledges 23a–23b forming an open-wall portion of the cavity. As the transparency has a slight tendency to roll around an axis parallel to the sprocket holes (i.e., sides 20c and 20d), the slide edge 20d will abut one of the bottoms, for example, bottom surface 16b, as shown in FIGURE 5. The tendency to curve, however, is such that the two bottoms 16a and 16b are too close to each other to permit unrestricted "curling" of the slide. Hence, the transparency will, in fact, with one side abut, where possible, to the other bottom surface of the cavity which in the drawings is 16a. Particularly, the transparency will abut bottom surface 16a along ledges 22a and 24a. Thus, the slide is forced into a position parallel to the one bottom surface (16a), particularly in areas around window 11a. For the chosen dimensions spreading of the transparency is sufficiently severe so that it will not curl into window 11a around any axis. An important feature is that the transparency is gripped by the bosses 12a, 13b, etc., as described and normally it does not move in the cavity. On the other hand, the rear edge 20d of a transparency is somewhat spaced from ledge 23b. Thus, if the transparency becomes warm, it can expand in the plane of its extension and will thus not "pop."

Another important feature is that the mounting does not have to be carried out in the manner as described. Instead, the transparency can be cut from a roll of film during mounting. The leading edge of the roll of film, analogous to edge 20a, is inserted into a slot such as 15a and as shown in FIGURE 7, also until the leading edge abuts the ledges 24b–25a. Then a transparency is cut from the roll of film along the line formed by the aligned ledges 24a and 25b at slot 15a; thereupon the transparency obtains the proper size. The transparency is then completely inserted as described.

If a slide is to be removed, a pair of tweezers, for example, can be inserted into the cavity through one of the slots, such as 15a or 15b. The slide binder is thereby slightly spread; the tweezers grip the slide, which is then removed upon withdrawal of the tweezers. It should be noted here that a small portion of the downwardly curved edge 20d of a slide is not hidden behind ledge 23b, but exposed and thus directly available for being lifted, at or near the bottom of slot 15b. It should be noted further that a slight pull suffices to overcome the gripping action of the bosses 12a, 13b, etc. A less sophisticated method of removal simply involves gripping of the tarnsparency through windows 11a and 11b and pulling slightly in direction opposite to arrow B. If done with gloves, damage may not result.

FIGURES 7 and 8 illustrate that the slide binder, in accordance with the invention, is not bound to a particular format. The windows can be larger or smaller with the insertion slots preferably being similarly displaced so that one side of each of them always registers with the ledges defining the cavity in between. The outer format is preferably selected so that the slide fits into the same type of slide projector, regardless of the size of the image of the transparency, particularly also regardless of the size of the picture or the size of the film from which the transparency has been cut. This, of course, is possible only within limits, and FIGURE 8 illustrates approximately maximum size for a given outer format for the binder.

The invention is not limited to the embodiments described above, but all changes and modifications thereof not constituting departures from the spirit and scope of the invention are intended to be covered by the following claims.

I claim:
1. A slide binder comprising:
   means forming a jacket-type envelope having registering windows at opposite sides, and having means defining a cavity in the interior of the envelope;
   means in the cavity of the envelope for gripping a slide at opposite sides when in the cavity and along one edge of the slide for positioning thereof in the cavity;
   the means defining the cavity including surfaces for spreading a slide in the cavity into an essentially plane configuration; and
   means defining a flat entrance into the cavity.

2. A slide binder as set forth in claim 1, the entrance being located opposite to the side of the cavity of the location of the gripping means, across the two registering windows.

3. A slide binder as set forth in claim 1, the means gripping suspending the slide along one of its edges in the cavity.

4. A slide binder comprising a pair of at least essentially similar, rectangularly shaped, overlying members having registering windows, each member having four ledges respectively along the four sides of the rectangle and outlining a cavity having a depressed bottom portion surrounding the window and being circumscribed at three sides by a U-shaped face extending between three of the four ledges and respectively three of the four sides of the rectangle, the two members being joined by the U-shaped faces, the three first mentioned ledges of each member forming three contiguous side walls together with the three ledges of the respective other member which together with the respective two bottom portions define a flat, narrow cavity for receiving a transparency, the surface of each member between the fourth ledge and the respective fourth side of the rectangular being depressed in relation to the U-shaped face, the respective bottom portion being depressed in relation to that fourth side, the depresseed faces of the two members facing each other form an entrance slot for the cavity:
   a cutaway slot in at least one member where having said depressed surface portion; and
   retaining bosses in the depressed bottom portion in each of the members and being positioned so that respective two bosses of the two members register when in overlying position, but leaving a gap slightly narrower than the thickness of a transparency to be inserted into the cavity.

5. A slide binder as set forth in claim 4, wherein said slot has one side registering with one of the three ledges and has a depth to extend to the fourth ledge.

6. A slide binder as set forth in claim 4, wherein the bosses of a member extend along the ledge opposite to the fourth ledge.

7. A slide binder as set forth in claim 4, wherein the distance between the fourth ledge and the respectively oppositely positioned ledge of each member exceeds slightly the corresponding dimension of a transparency when inserted in said cavity commensurate with the thermal expansion of the transparency.

8. A slide binder as set forth in claim 4, the two members having different color.

9. A slide binder as set forth in claim 4, the two members being fused together by their respective U-shaped faces.

10. A slide binder member comprising:
a flat, rectangular piece having flat first and seocnd opposite sides;
a rectangular window in the member;
a depressed surface portion on the first side, extending around the window and forming at least three ledges with the remaining surface portions of the first side, the three ledges then being three sides of a rectangle smaller than the rectangle of the piece but larger than the window; and
a pair of gripping bosses projecting from the depressed surface at a height less than the height of the ledges.

11. A slide binder member as set forth in claim 10, a fourth ledge being formed opposite the middle one of the three ledges, at a height less than the height of said three ledges, so that the member has a depressed surface portion in relation to said remaining surface portion but above said depressed surface portion around said window.

12. A slide binder member as set forth in claim 11, a cutaway slot in the member extending to said fourth ledge and aligned with one of the three ledges, not being the middle one.

References Cited

UNITED STATES PATENTS

| | | | |
|---|---|---|---|
| 2,390,053 | 12/1945 | Bradford | 40—152 |
| 2,823,478 | 2/1958 | Ostergaard et al. | 40—152 |
| 2,834,136 | 5/1958 | Kiehl et al. | 40—159 |
| 3,341,960 | 9/1967 | Florjancic et al. | 40—152 |

EUGENE R. CAPOZIO, Primary Examiner

WENCESLAO J. CONTRERA, Assistant Examiner